US012309527B2

(12) United States Patent
Honma

(10) Patent No.: US 12,309,527 B2
(45) Date of Patent: May 20, 2025

(54) TERMINAL DEVICE PRESENTATION SYSTEM, TERMINAL DEVICE, CONNECTION CONTROL METHOD, AND PROGRAM

(71) Applicant: Sharp NEC Display Solutions, Ltd., Tokyo (JP)

(72) Inventor: Kazuya Honma, Tokyo (JP)

(73) Assignee: Sharp NEC Display Solutions, Ltd., Tokyo (JP)

( * ) Notice: Subject to any disclaimer, the term of this patent is extended or adjusted under 35 U.S.C. 154(b) by 676 days.

(21) Appl. No.: 17/142,479

(22) Filed: Jan. 6, 2021

(65) Prior Publication Data

US 2021/0125531 A1   Apr. 29, 2021

Related U.S. Application Data

(63) Continuation of application No. PCT/JP2018/026041, filed on Jul. 10, 2018.

(51) Int. Cl.
*H04N 7/15* (2006.01)
*H04B 7/155* (2006.01)
*H04L 65/403* (2022.01)
*H04N 7/14* (2006.01)
*H04L 12/46* (2006.01)

(52) U.S. Cl.
CPC .......... *H04N 7/15* (2013.01); *H04B 7/15528* (2013.01); *H04L 65/403* (2013.01); *H04N 7/147* (2013.01); *H04L 12/46* (2013.01)

(58) Field of Classification Search
CPC ....... H04B 7/155; H04B 7/15528; G06F 3/14; H04L 12/46; H04N 7/147; H04N 7/15;
(Continued)

(56) References Cited

U.S. PATENT DOCUMENTS

2002/0138635 A1   9/2002   Redlich et al.
2009/0270105 A1*  10/2009  Kakumaru .......... H04W 36/36
                                                455/436
(Continued)

FOREIGN PATENT DOCUMENTS

EP    1 643 684 A1    4/2006
JP    2007-507125 A   3/2007
(Continued)

OTHER PUBLICATIONS

Seiko Epson Corp., Radio Communication Terminal, Radio Communication Device, Radio Communication System, Radio Communication Method, and Radio Communication Program, Jun. 7, 2018, English translation of JP-2018088582-A (Year: 2018).*

(Continued)

*Primary Examiner* — Quoc D Tran
(74) *Attorney, Agent, or Firm* — MCGINN I.P. LAW GROUP, PLLC

(57) ABSTRACT

A terminal device presentation system (1) includes: a relay device (20) which relays communication between a display device (50) and a terminal device (T), transmits an image signal from the terminal device to the display device and causes the display device to display the image signal; and a terminal connection processor (100) which performs processing of connection to the relay device in the terminal device, wherein the relay device includes a connection processor (200) which transmits connection information of an accessible network to the terminal device, and the terminal device includes a switching control unit (150) which connects the terminal device to a second network that is accessible for at least the relay device and different from a first network and is set in the terminal device such that a user of the terminal device uses the second network in preference (Continued)

to the first network, when the terminal device is connectable to the second network.

6 Claims, 14 Drawing Sheets

(58) Field of Classification Search
CPC ............ G09G 3/001; G09G 2370/025; G09G 2370/16; G09G 2358/00; G09G 2354/00
USPC ............................................ 348/14.01–14.16
See application file for complete search history.

(56) References Cited

U.S. PATENT DOCUMENTS

| | | | | |
|---|---|---|---|---|
| 2010/0008370 A1* | 1/2010 | Li | ..................... | H04L 61/2514 |
| | | | | 370/401 |
| 2015/0269704 A1* | 9/2015 | Irie | ......................... | G06F 3/14 |
| | | | | 345/520 |
| 2018/0324897 A1* | 11/2018 | Wu | ..................... | H04W 88/04 |
| 2019/0273554 A1* | 9/2019 | Minakuchi | ......... | H04N 21/6131 |

FOREIGN PATENT DOCUMENTS

| | | |
|---|---|---|
| JP | 3951757 B2 | 8/2007 |
| JP | 2008-098880 A | 4/2008 |
| JP | 2009-535946 A | 10/2009 |
| JP | 5725532 B2 | 5/2015 |
| JP | 2015-185868 A | 10/2015 |
| JP | 2018088582 A * | 6/2018 |

OTHER PUBLICATIONS

International Search Report (ISR) (PCT Form PCT/ISA/210), in PCT/JP2018/026041, dated Oct. 2, 2018.

* cited by examiner

TERMINAL DEVICE PRESENTATION SYSTEM, TERMINAL DEVICE, CONNECTION CONTROL METHOD, AND PROGRAM

TECHNICAL FIELD

The present invention relates to a terminal device presentation system, a terminal device, a connection control method, and a program.

BACKGROUND ART

There is technology of performing connection while maintaining a security level when a network such as a wireless local area network (LAN) is used. For example, Patent Literature 1 and Patent Literature 2 disclose methods of maintaining security through authentication of data and the like in order to access a network through an access point operated by a third party. In addition, Patent Literature 3 discloses a method of inhibiting security degradation in a system for performing wireless communication on the basis of set security information.

CITATION LIST

Patent Literature

[Patent Literature 1]
  Japanese Patent No. 3951757
[Patent Literature 2]
  Japanese Patent No. 5725532
[Patent Literature 3]
  Japanese Unexamined Patent Application, First Publication No. 2007-507125

SUMMARY OF INVENTION

Technical Problem

However, in a situation in which videos or images are shared with other people using a device (e.g., a device that receives images, such as a liquid crystal display or a projector) connected to a plurality of networks having different security levels, there are cases in which different connection methods (e.g., dedicated applications and the like) are provided for networks used by a user of the device. In such cases, the user needs to select a network when the device is connected for communication, understand a connection method for participating in the network and then perform a connection operation by himself/herself, the connection procedure tends to be hard to understand. Furthermore, since there are a plurality of operation procedures for a manger to disclose to users, maintenance deteriorates and lack of adaptability may become a problem.

An object of the present invention is to provide a terminal device presentation system, a connection control method, and a program for commonizing a connection interface for a device that connects to a plurality of networks having different security levels.

Solution to Problem

In order to solve the aforementioned problems, a terminal device presentation system according to one aspect of the present invention includes: a relay device which relays communication between a display device and a terminal device, transmits an image signal from the terminal device to the display device and causes the display device to display the image signal; and a terminal connection processor which performs processing of connection to the relay device in the terminal device, wherein the relay device includes a connection processor which transmits connection information of an accessible network to the terminal device, and the terminal device includes a switching control unit which connects the terminal device to a second network that is accessible for at least the relay device and different from a first network and is set in the terminal device such that a user of the terminal device uses the second network in preference to the first network when the terminal device is connectable to the second network.

A connection control method according to one aspect of the present invention includes processes of: wirelessly connecting to a relay device; receiving at least information of an access point from the relay device; disconnecting wireless connection to the relay device and wirelessly connecting to the access point or maintaining wireless connection to the relay device on the basis of the information of the access point received from the relay device; connecting communication with the relay device through wireless connection to the access point when wireless connection to the access point is performed; and connecting communication with the relay device through wireless connection to the relay device when wireless connection to the relay device is maintained.

Advantageous Effects

According to the present invention, it is possible to resolve difficulty in understanding a connection procedure by standardizing a connection interface for connection for a device that connects to a plurality of networks having different security levels. Furthermore, according to the present invention, it is possible to save the effort of a user in selecting an optimal network from a plurality of networks.

DESCRIPTION OF EMBODIMENTS

Hereinafter, embodiments of the present invention will be described with reference to the drawings. First, a terminal device presentation system 1Z of a reference example will be described and then a terminal device presentation system 1 of the present invention will be described.

Figure 1:
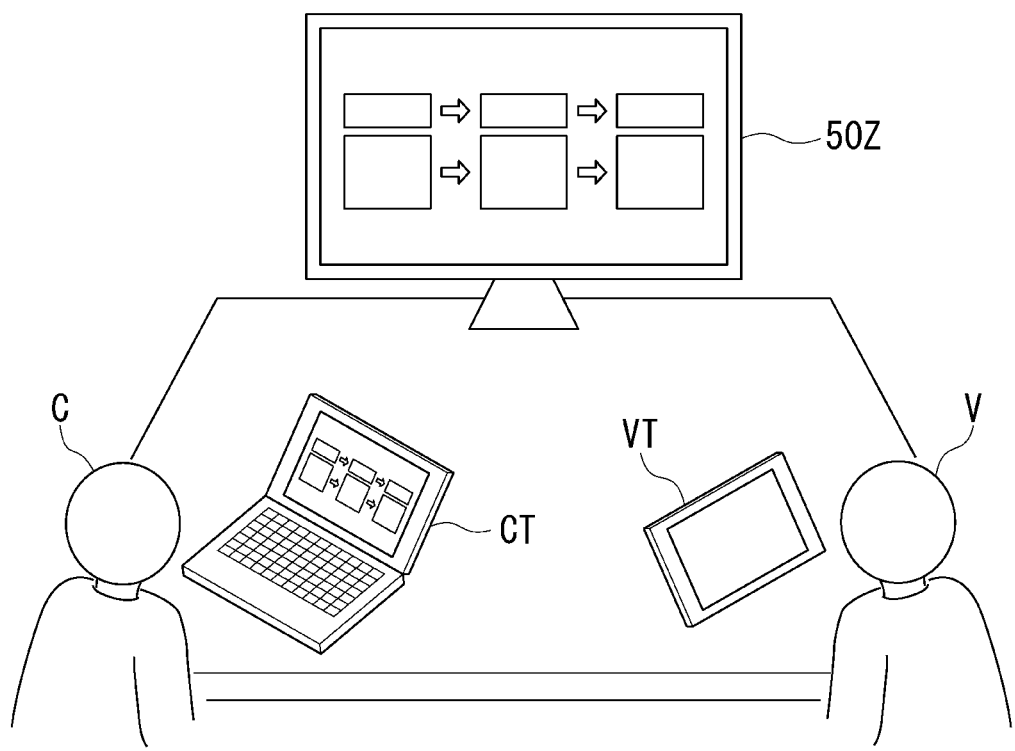
FIG. 1 is a schematic diagram representing an environment in which a terminal device presentation system of a reference example is used.

FIG. 1 is a schematic diagram for describing a situation in which the terminal device presentation system 1Z of the reference example is used. The terminal device presentation system 1Z is a system used to connect a display device 50Z such as a liquid crystal display installed in a conference room or the like of a company and terminal devices of conference participants when the terminal devices of the conference participants are connected to the display device 50Z and an image such as presentation software is projected on the display device 50Z. Terminal devices may be, for example, a personal computer (PC), a tablet terminal, and the like.

As illustrated in FIG. 1, an employee C and a visitor V are having a meeting using the display device 50Z. Here, the employee C projects images such as presentation software of a terminal device (hereinafter, a company terminal CT) used by the employee C on the display device 50Z. In this situation, when a main speaker changes to the visitor V, a terminal connected to the display device 50Z may be changed to a terminal (hereinafter, a visitor terminal VT) used by the visitor V. Meanwhile, there are cases in which the employee C and the visitor V are referred to as a "user" when they are not particularly distinguished from each other in the following description. In addition, there are cases in which the company terminal CT and the visitor terminal VT are referred to as a "terminal device T" when they are not particularly distinguished from each other.

Figure 2:
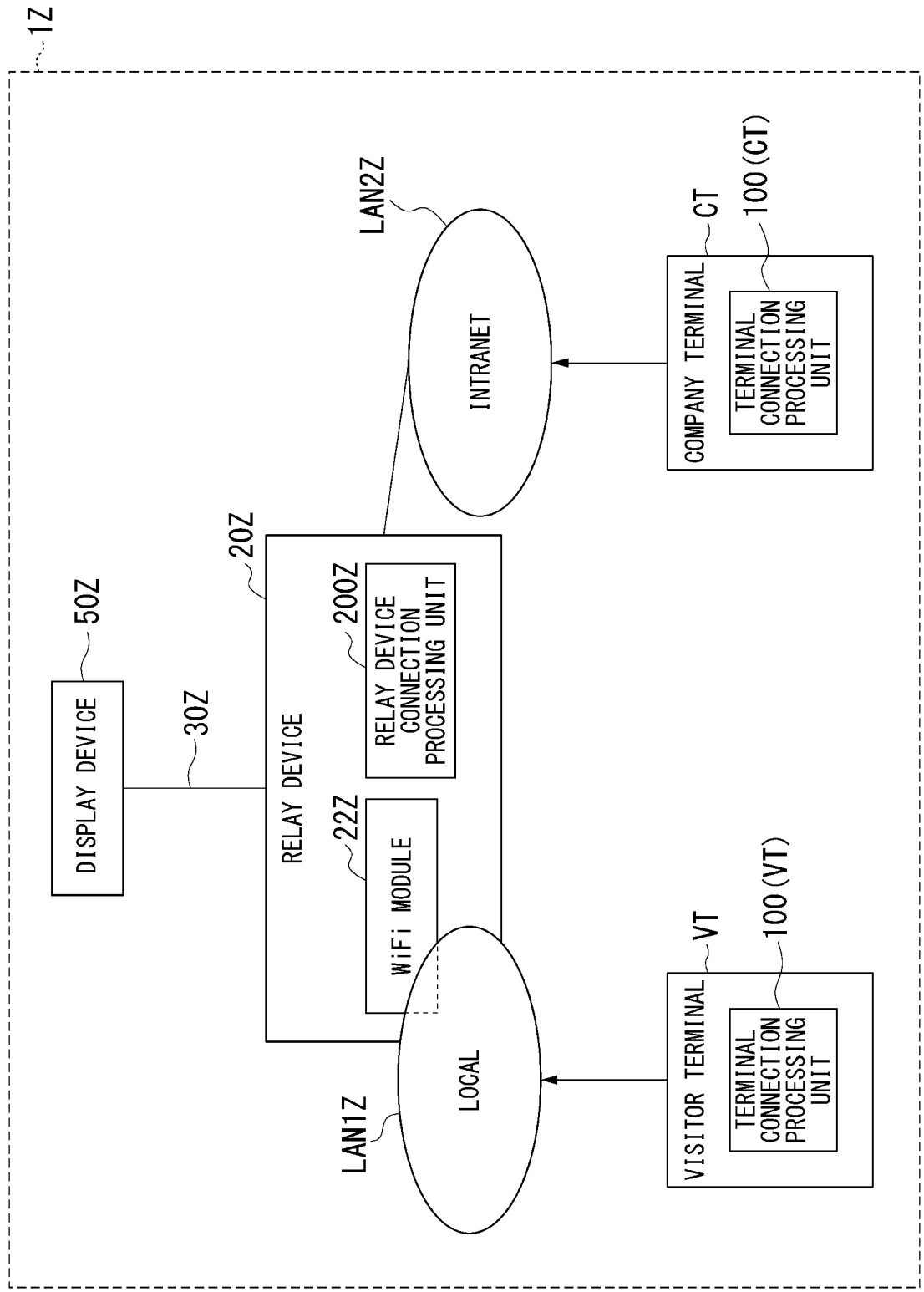
FIG. 2 is an overview diagram of the terminal device presentation system of the reference example.

FIG. 2 is an overview diagram illustrating a configuration of the terminal device presentation system 1Z of the reference example. The terminal device presentation system 1Z may include, for example, the display device 50Z, a relay device 20Z, and a connection cable 30Z. The display device 50Z may be, for example, a liquid crystal display or a projector. The relay device 20Z is connected using the connection cable 30Z. The connection cable 30Z may be, for example, a High-Definition Multimedia Interface (HDMI; registered trademark) cable that connects the display device 50Z and the relay device 20Z. The relay device 20Z receives an image signal for projecting an image such as presentation software reproduced through a terminal device T of a user and causes the display device 50Z to display the image signal.

The relay device 20Z may include, for example, a WiFi module 22Z and a relay device connection processor 200Z. The WiFi module 22Z operates as an access point (master station) and forms a first network LAN1. Details of processing of the relay device connection processor 200Z will be described later.

The terminal device presentation system 1Z is connected to the first network LAN1 that is a local network for visitors and a second network LAN2 that is an intranet for employees. As compared to the first network LAN1, the second network LAN2 is a more secure network environment in which it is determined whether a terminal device T can be permitted to connect to the second network LAN2 by using a dedicated authentication server at the time of log-in to perform authentication using an ID for identifying an employee C and identification information of the terminal device T. In addition, the second network LAN2 can connect to an intranet for employees, for example, whereas the first network LAN1 cannot connect to the intranet for employees and is configured to be unable to connect to apparatuses other than an apparatus permitted by a manager of the terminal device presentation system 1Z (e.g., the relay device 20Z). Further, profile settings are set for the company terminal CT to use the second network LAN2 in preference to the first network LAN1.

When the visitor V uses the terminal device presentation system 1Z, the visitor V connects the visitor terminal VT to the relay device 20Z through the first network LAN1. On the other hand, when the employee C uses the terminal device presentation system 1Z, the employee C connects the company terminal CT to the relay device 20Z through the second network LAN2. For example, the terminal device presentation system 1Z may receive a connection request for the relay device 20Z and the terminal device T from a user through a terminal connection processor 100Z executed in the terminal device T. The terminal connection processor 100Z may be, for example, an application realized in the terminal device T.

Meanwhile, although FIG. 2 illustrates an example in which two terminals (the company terminal CT and the visitor terminal VT) are connected to the relay device 20Z, this is an example and the number of terminals connected to the relay device 20Z is not limited thereto. In addition, although FIG. 2 illustrates an example in which the display device 50Z and the relay device 20Z are connected using the connection cable 30Z, the display device 50Z and the relay device 20Z may be connected through wireless communication instead of a wired cable or a configuration in which the display device 50Z includes the relay device 20Z may be employed. Further, communication between the relay device 20Z and the second network LAN2 need not necessarily be wired connection and may be, for example, connection via a wireless network different from the first network LAN1.

Figure 3:
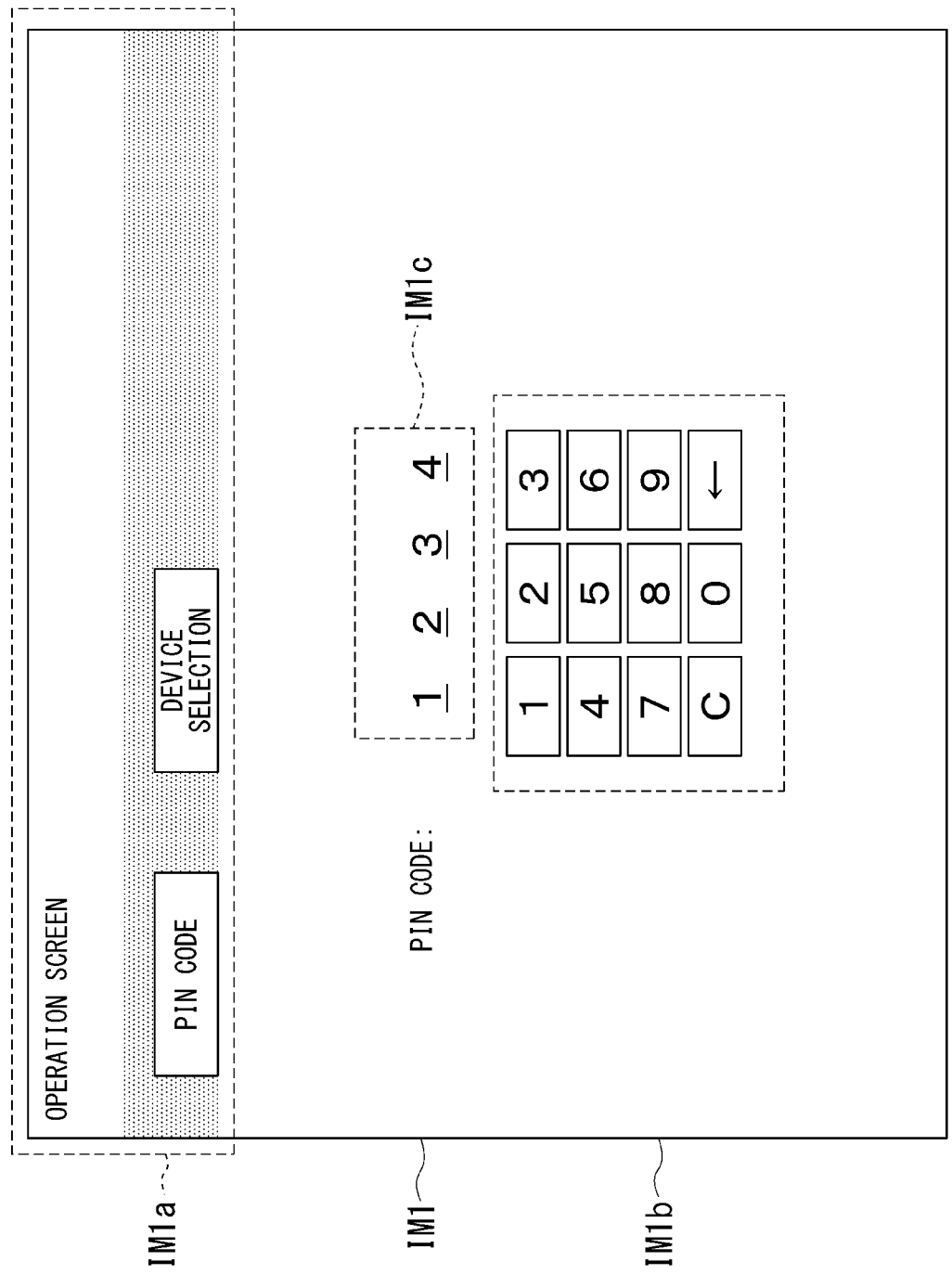
FIG. 3 is an explanatory diagram illustrating an example of a screen of the terminal device presentation system of the reference example.

FIG. 3 is an explanatory diagram illustrating an example of a screen of the terminal connection processor 100Z of the terminal device presentation system 1Z of the reference example. For example, FIG. 3 may be a PIN code input screen IM1 displayed on a display unit of the visitor terminal VT that executes the terminal connection processor 100. The PIN code input screen IM1 may include, for example, a screen title display part IM1*a*, an input receiving part IM1*b*, and a personal identification number (PIN) code display part IM1*c*. A PIN code is a code number used for authentication and the like. Meanwhile, although an example in which authentication is performed using a 4-digit PIN code will be illustrated in the following example, this is an example and the number of digits of a PIN code is not limited thereto.

The screen title display part IM1*a* is displayed in a default state preset by the terminal device presentation system 1Z. The screen title display part IM1*a* may or may not receive an operation (e.g., display of a link to a help screen, or the like) of the visitor V. When the screen title display part IM1*a* receives an operation of the visitor V, the screen title display part IM1*a* may receive an operation of switching between display of tabs of a "PIN code" screen (FIG. 3) and a "device selection" screen (FIG. 4), for example.

The input receiving part IM1*b* receives an input operation of the visitor V. The input receiving part IM1*b* may be, for example, input buttons. When the visitor V performs an operation such as pressing buttons through an input device such as a mouse or a keyboard included in the visitor terminal VT, the input receiving part IM1*b* receives the input operation (e.g., an operation such as input of numbers, deletion of an input number, or movement of a cursor). The PIN code display part IM1*c* displays an input result received by the input receiving part IM1*b*. In addition, when the visitor V can input numbers by operating an input device such as the keyboard included in the visitor terminal VT, the PIN code display part IM1*c* may receive the operation and display the input numbers. The terminal device presentation system 1Z removes operation restriction only when a PIN code input through the PIN code input screen IM1 is consistent with a character string set in advance by the manager of the terminal device presentation system 1 and connects the visitor terminal VT to the relay device 20Z through the first network LAN1.

Meanwhile, the aforementioned operation through the PIN code input screen IM1 is an example of the operation for connecting the visitor terminal VT to the relay device 20Z through the first network LAN1 and a method of connecting to the first network LAN1 is not limited thereto. For example, a user of the visitor terminal VT may manually select connection to the first network LAN1.

Figure 4:
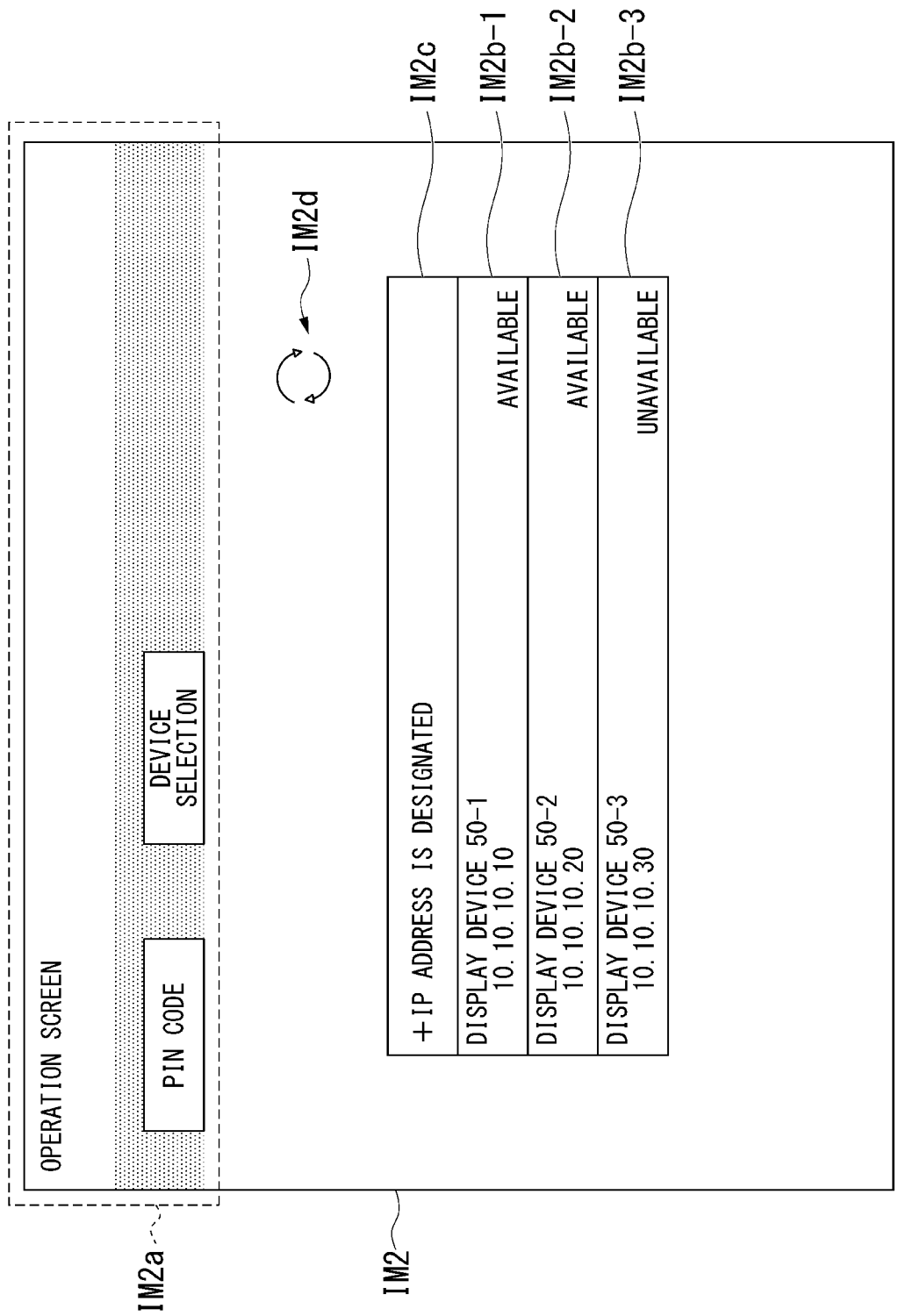
FIG. 4 is an explanatory diagram illustrating another example of a screen of the terminal device presentation system of the reference example.

FIG. 4 is an explanatory diagram illustrating another example of the screen of the terminal connection processor 100Z of the terminal device presentation system 1Z of the reference example. FIG. 4 is a device selection screen IM2 displayed on a display unit of the company terminal CT that executes the terminal connection processor 100Z. The device selection screen IM2 may include, for example, a screen title display part IM2*a*, a plurality of device selection receiving parts IM2*b*, a new device designation receiving part IM2*c*, and a device display update part IM2*d*.

The screen title display part IM2*a* is displayed in a default state preset by the terminal device presentation system 1Z like the screen title display part IM1*a* of the PIN code input screen IM1. The screen title display part IM2*a* may have the same configuration as the screen title display part IM1*a* or another configuration. When the screen title display part IM2*a* receives an operation of the employee C, the screen title display part IM2*a* may receive, for example, an operation of switching between display of tabs of the "PIN code" screen (FIG. 3) and the "device selection" screen (FIG. 4) or receive, for example, an operation (display of a link to a connection information display screen IM3 which will be described later) performed by the employee C.

The device selection receiving parts IM2*b* display titles for identifying relay devices 20 managed by the terminal device presentation system 1Z, IP addresses, availability states of the relay devices 20Z, and the like. When a relay device 20Z to which the employee C wants to connect is displayed in any of the device selection receiving parts IM2*b* and the use state thereof is an available state, the employee C selects the device selection receiving part IM2*b* displaying the relay device 20Z using an input device of the company terminal CT, such as a keyboard or a mouse. The device selection receiving parts IM2*b* initially display relay devices 20Z connected to the same network segment as that to which the company terminal CT is connected.

The new device designation receiving part IM2*c* receives new registration of the employee C when connection information of the relay device 20Z to which the employee C intends to connect is not displayed in the device selection receiving parts IM2*b*.

The device display update part IM2*d* receives an instruction of processing for updating display of the device selection receiving parts IM2*b* to a latest state. The employee C operates the device display update part IM2*d* to update display of the device selection receiving part IM2*b* to a latest state. For example, when the employee C wants to use a display device 50-3 with an IP address of "10.10.10.30" and resolution of the cause of unavailability has already ended, the employee C operates the device display update part IM2*d* to update display of the device selection receiving parts IM2*b* to a latest state and checks whether the display device 50-3 has become available. Meanwhile, when information of a large number of (e.g., about 10) relay devices is displayed on one screen, the device selection receiving part IM2*b* may display a scroll bar or the like such that the employee C can select any one from all relay devices 20Z.

Figure 5:
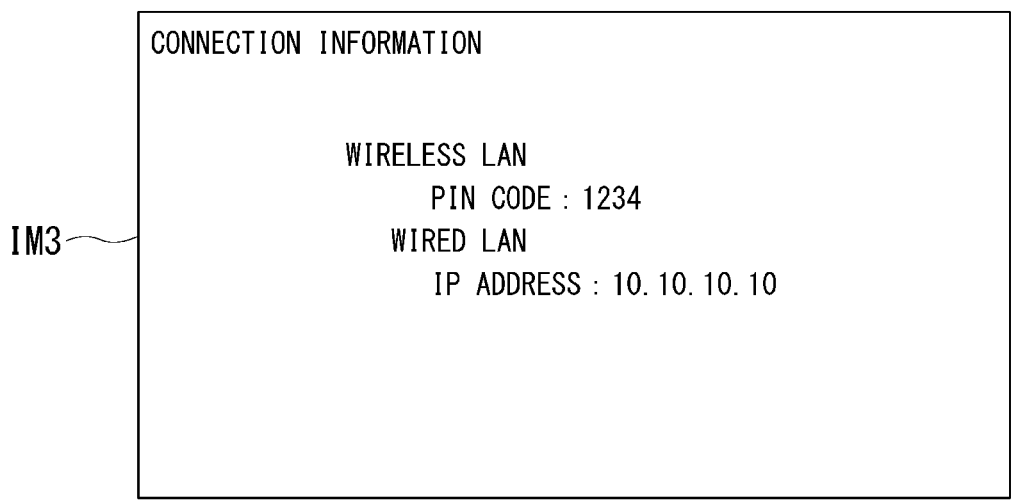
FIG. 5 is an explanatory diagram illustrating an example of connection information of the terminal device presentation system of the reference example.

FIG. 5 is an explanatory diagram illustrating an example of a screen IM3 displaying connection information of the terminal device presentation system 1Z of the reference example. The screen IM3 illustrated in FIG. 5 displays connection information of the display device 50-1 illustrated in FIG. 3 and FIG. 4. The screen IM3 displays connection information such as a PIN code input through the PIN code input screen IM1 illustrated in FIG. 3 and an IP address of a relay device 20Z selected or input through the device selection screen IM2 illustrated in FIG. 4. The connection information displayed on the screen IM3 illustrated in FIG. 5 is set by the manager of the terminal device presentation system 1Z. The screen IM3 can be checked through the display device 50Z or the terminal connection processor 100Z of the terminal connection processor 100Z, for example.

Figure 6:
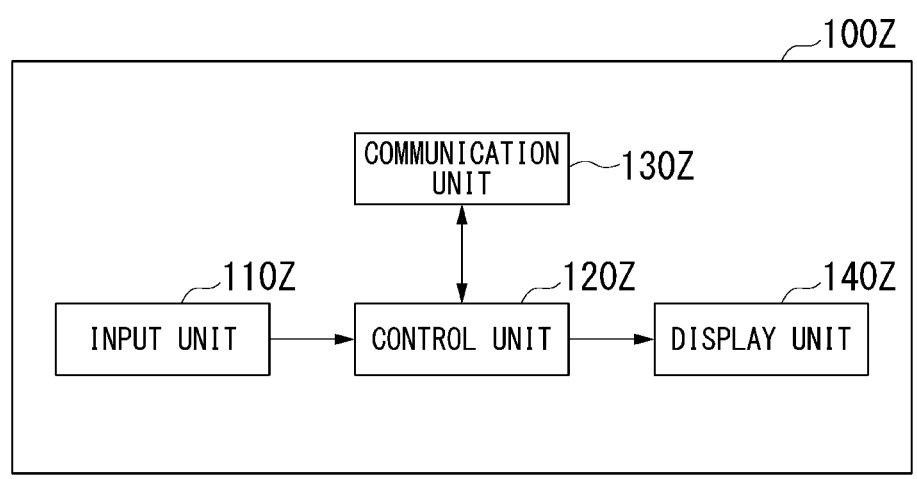
FIG. 6 is a block diagram illustrating a functional configuration of a terminal connection processor of the terminal device presentation system of the reference example.

FIG. 6 is a block diagram illustrating a functional configuration of the terminal connection processor 100Z which displays the screens IM1 to IM3 illustrated in FIG. 3 to FIG. 5. That is, the terminal connection processor 100Z includes an input unit 110Z, a control unit 120Z, a communication unit 130Z, and a display unit 140Z as basic components.

The input unit 110Z receives input information input by a user using an input device of a terminal device T and outputs the input information to the control unit 120Z. The input information may be, for example, a PIN code on the PIN code input screen IM1. The control unit 120Z outputs the input information output from the input unit 110Z to the communication unit 130Z. The communication unit 130Z transmits the input information output from the control unit 120Z to the relay device connection processor 200Z. The communication unit 130Z receives a response result of the input information from the relay device connection processor 200Z and outputs the response result to the control unit 120Z. The control unit 120Z outputs a display command to the display unit 140Z on the basis of the response result of the input information output from the communication unit 130Z. For example, when a visitor V inputs a wrong PIN code and PIN code authentication of the relay device connection processor 200Z has failed, the communication unit 130Z receives the authentication result and outputs a command to the display unit 140Z such that the display unit 140Z displays a message or the like which represents that PIN code authentication has failed.

Figure 7:
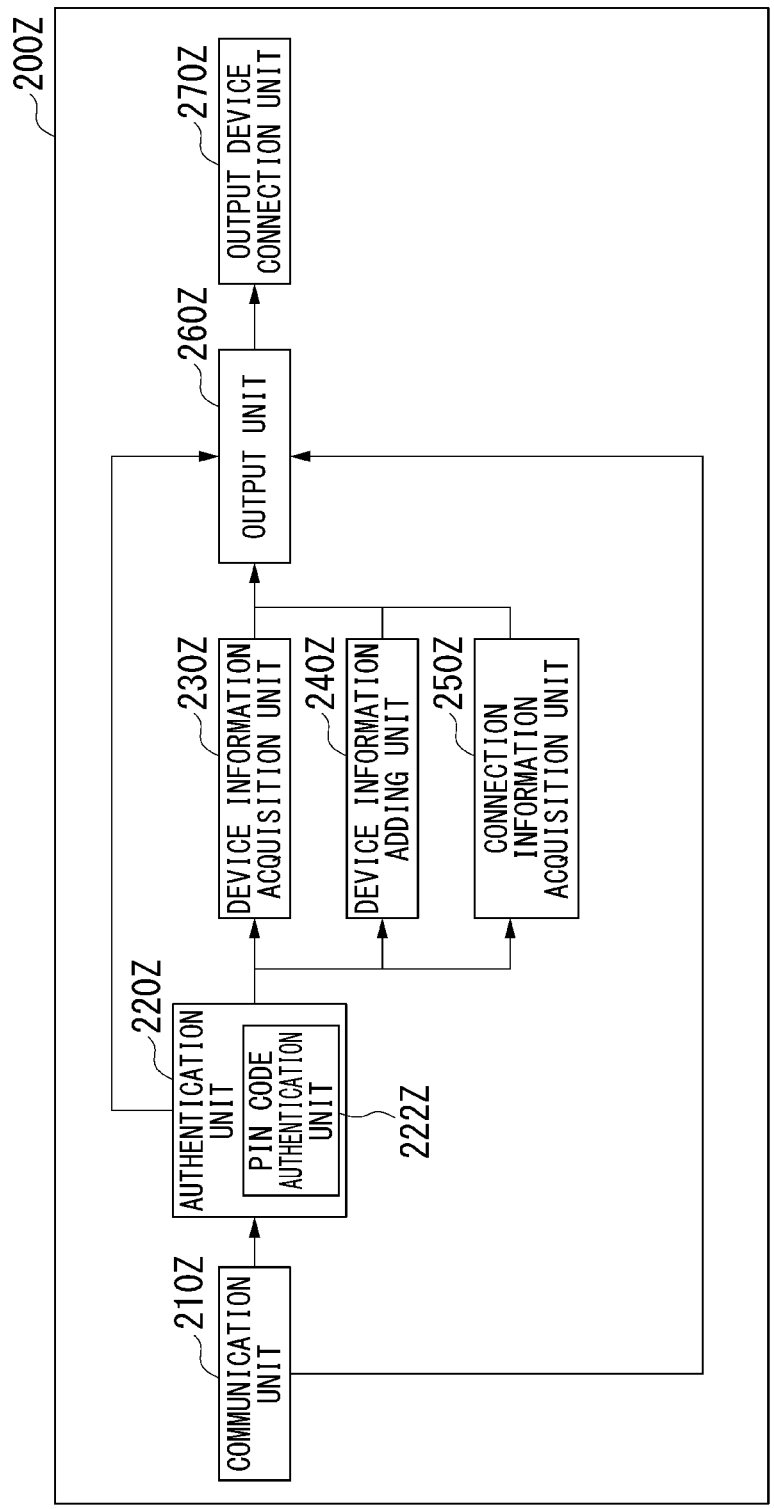
FIG. 7 is an overview diagram illustrating a configuration of an example of a relay device connection processor of the terminal device presentation system of the reference example.

FIG. 7 is a block diagram illustrating a functional configuration of the relay device connection processor 200Z which communicates with the terminal connection processor 100Z. That is, the relay device connection processor 200Z according to the present invention includes a communication unit 210Z, an authentication unit 220Z, a device information acquisition unit 230Z, a device information adding unit 240Z, a connection information acquisition unit 250Z, an output unit 260Z, and a display device connection unit 270Z as basic components. The relay device connection processor 200Z may be realized by, for example, a central processing unit (CPU) of the relay device 20Z, or the like, and controls communication between the relay device 20Z and the terminal connection processor 100Z.

Hereinafter, details of processing of the relay device connection processor 200Z when the visitor V operates the PIN code input screen IM1 will be described, and then details of processing of the relay device connection processor 200Z when the employee C operates the device selection screen IM2 will be described.

[When PIN Code Input Screen IM1 is Operated]

The communication unit 210Z communicates with the communication unit 130Z of the terminal connection processor 100Z and receives input information. The communication unit 210Z identifies the type of the received input information and selectively outputs the input information to the output unit 260Z or the authentication unit 220Z on the basis of the identified type. Specifically, when a PIN code received through the input receiving part IM1b is input, for example, the communication unit 210Z outputs the PIN code to the authentication unit 220Z. An input information type may be, for example, information for identifying a screen of the terminal connection processor 100Z or a component thereof (e.g., the screen title display part IM1a).

The authentication unit 220Z may include, for example, a PIN code authentication unit 222Z. The PIN code authentication unit 222Z identifies a PIN code input to the input receiving part IM1b of the PIN code input screen IM1 (i.e., displayed on the PIN code display part IM1c) and performs PIN code authentication processing when the authentication unit 220Z determines that a user is a visitor V and an operation is received. The PIN code authentication unit 222Z determines that the input PIN code can be authenticated, that is, connection to the first network LAN1 can be permitted when the input PIN code is consistent with a PIN code preset by the manager or the like of the terminal device presentation system 1Z, which is stored in a storage unit (not shown) included in the PIN authentication unit 222Z, as a PIN code authentication processing result and determines that the input PIN code is not authenticated, that is, connection to the first network LAN1 is not permitted, when the input PIN code is not consistent with the PIN code set by the manager or the like. The PIN code authentication unit 222Z outputs an authentication processing determination result to the output unit 260Z.

In addition, the authentication unit 220Z identifies whether a user is an employee C or a visitor V on the basis of identification result input through the communication unit 210Z and performs authentication processing for determining whether to receive the input information. For example, the authentication unit 220Z may acquire identification information of a terminal, inquire of an authentication server (not shown) about the acquired identification information, and when the identification information on a company terminal CT has been registered, authenticate that the user is an employee C.

For example, the authentication unit 220Z does not receive input information through operation of the PIN code input screen IM1 when the user is an employee C but receives input information through operation of the PIN code input screen IM1 when the user is a visitor V. The authentication unit 220Z performs the aforementioned authentication processing and outputs a determination result to the output unit 260Z.

When the determination result output from the authentication unit 220Z is a determination result representing that authentication is not performed, the output unit 260Z controls a visitor terminal VT such that the visitor terminal VT displays error information corresponding to the determination result on the basis of the determination result. When the determination result output from the authentication unit 220Z is a determination result representing that authentication is performed, the output unit 260Z outputs an instruction by which the terminal connection processor 100Z causes the visitor terminal VR or the display device 50 that has started to display message information based on the determination result (e.g., a message representing a processing state of the terminal device presentation system 1Z, such as "Connection is in progress. Please wait a moment.") and the display device connection unit 270Z connects the visitor terminal VT to the first network LAN1.

The display device connection unit 270Z connects the visitor terminal VT to the first network LAN1 and additionally performs processing of connecting the display device 50Z and the visitor terminal VT in response to the connection instruction output from the output unit 260Z.

[When Device Selection Screen IM2 is Operated]

The communication unit 210Z communicates with a terminal that executes the terminal connection processor 100Z, receives input information from the terminal connection processor 100Z, and selectively outputs the input information to any of the output unit 260Z and the authentication unit 220Z on the basis of a result of identification of the type of the received input information as when the PIN code input screen IM1 is operated. Specifically, when a command for displaying connection information received through the screen title display part IM2a or an operation of the device selection receiving part IM2b or the new device designation receiving part IM2c is received, for example, the communication unit 210Z outputs an identification result to the authentication unit 220Z.

In addition, when input information for selecting device information acquired by the device information acquisition unit 230Z which will be described later is received, the communication unit 210Z outputs the received input information to the authentication unit 220Z.

The authentication unit 220Z identifies whether a user is an employee C or a visitor V on the basis of the identification result input from the communication unit 210Z and performs authentication processing for determining whether the input information can be received. For example, the authentication unit 220Z may acquire identification information of the terminal, inquire of an authentication server (not shown) about the acquired identification information, and when the identification information on a company terminal CT has been registered, authenticate that the user is an employee C.

For example, the authentication unit 220Z receives input information through operation of the device selection screen IM2 when the user is an employee C but does not receive input information through operation of the device selection screen IM2 when the user is a visitor V. When it is determined that the input information can be received as a result of the aforementioned authentication processing, the authentication unit 220Z outputs the determination result to any of the device information acquisition unit 230Z, the device information adding unit 240Z, the connection information acquisition unit 250Z, and the output unit 260Z on the basis of the type of the received input information. Specifically, the authentication unit 220Z outputs the determination result to the connection information acquisition unit 250Z when the type of the input information corresponds to the screen title display part IM2*a* and is a connection information display command and outputs the determination result to the output unit 260Z when the type of the input information is a help information display command or the like. When the type of the input information corresponds to the new device designation receiving part IM2*c*, the authentication unit 220Z outputs the determination result to the device information adding unit 240Z. When the type of the input information corresponds to the device selection receiving part IM2*b*, the authentication unit 220Z outputs the determination result to the output unit 260Z. When the type of the input information corresponds to the device display update part IM2*d*, the authentication unit 220Z outputs the determination result to the device information adding unit 240Z. When it is determined that the input information is not received as a result of authentication processing, the authentication unit 220Z outputs the determination result to the terminal device T through the communication unit 210Z.

In addition, when input information for selecting device information is received through the communication unit 210Z, the authentication unit 220Z includes selected device information in the determination result of authentication processing and outputs the determination result including the selected device information to the output unit 260Z. The device information acquisition unit 230Z acquires latest device information and outputs the acquisition result to the output unit 260Z in response to the determination result output from the authentication unit 220Z.

The device information adding unit 240Z adds device information in response to the determination result output from the authentication unit 220Z. When addition of the device information has been performed normally, the device information adding unit 240Z outputs a processing result to the output unit 260Z. When addition of the device information has not been performed normally, the device information adding unit 240Z outputs a processing result including error information to the output unit 260Z.

The connection information acquisition unit 250Z acquires connection information and outputs an instruction for output of the screen IM3 to the output unit 260Z in response to the determination result output from the authentication unit 220Z.

The output unit 260Z performs output in response to the input processing result. For example, when the determination result output from the authentication unit 220Z is a determination result representing that authentication is not performed, the output unit 260Z selectively displays error information corresponding to the determination result on the basis of the determination result. When the determination result output from the authentication unit 220Z is a determination result representing that authentication is performed, the output unit 260Z displays message information based on the determination result (e.g., a message representing a processing state of the terminal device presentation system 1Z, such as "Connection is in progress. Please wait for a moment.") through the terminal connection processor 100Z and outputs a processing result to the display device connection unit 270Z.

The output unit 260Z outputs the processing result of the device information adding unit 240Z in response to the processing result of the device information adding unit 240Z. When the device information adding unit 240Z has normally performed device addition, the output unit 260Z may output the processing result to the display device connection unit 270Z. The output unit 260Z outputs the screen IM3 in response to the instruction for output of the screen IM3, which is output from the connection information acquisition unit 250Z.

The display device connection unit 270Z performs processing for connection of the display device 50Z and the company terminal CT in response to the processing result output from the output unit 260Z. The display device connection unit 270Z outputs an image signal received from the company terminal CT to the display device 50Z and causes the display device 50Z to project an image.

Meanwhile, processing of the authentication unit 220Z for identifying an employee C and a visitor V may be realized, for example, through the terminal connection processor 100Z. When processing of the authentication unit 220Z for identifying an employee C and a visitor V is realized through the terminal connection processor 100Z, security control for restricting tabs that can be selected by a user may be performed. In addition, when PIN code authentication unit 222Z determines that authentication is allowed, message information based on the determination result from the output unit 260Z may be allotted and a connection instruction may be output to the display device connection unit 270Z. As described above, the terminal device presentation system 1Z of the reference example receives an operation of a user and causes the display device 50Z to project image signals output from the company terminal CT and the visitor terminal VT.

Meanwhile, although an example in which the employee C and the visitor V use the same terminal connection processor 100Z (connection application) in the terminal device presentation system 1Z of the aforementioned reference example has been illustrated, a dedicated application for employees C and a dedicated application for visitors V may be respectively provided.

As described above, in the terminal device presentation system 1Z of the reference example, since information used by a user for connection is different from information used by a terminal device T for connection, the user is likely to be unable to easily understand and select which one of a PIN code and device selection will be used for connection when the user refers to connection information as illustrated in FIG. 5. Furthermore, in the case of irregular use patterns, such as cases in which an employee C who uses the company terminal CT temporarily borrows and uses the visitor terminal VT or a visitor V temporarily borrows and uses the company terminal CT, for example, the user is likely to be unable to intuitively understand which one of a PIN code and device selection will be used. Accordingly, in the terminal device presentation system 1 of the present embodiment, security settings depending on a user are realized as in the terminal device presentation system 1Z while a procedure of connecting to a relay device is simplified by unifying information used by the user for connection.

Figure 8:
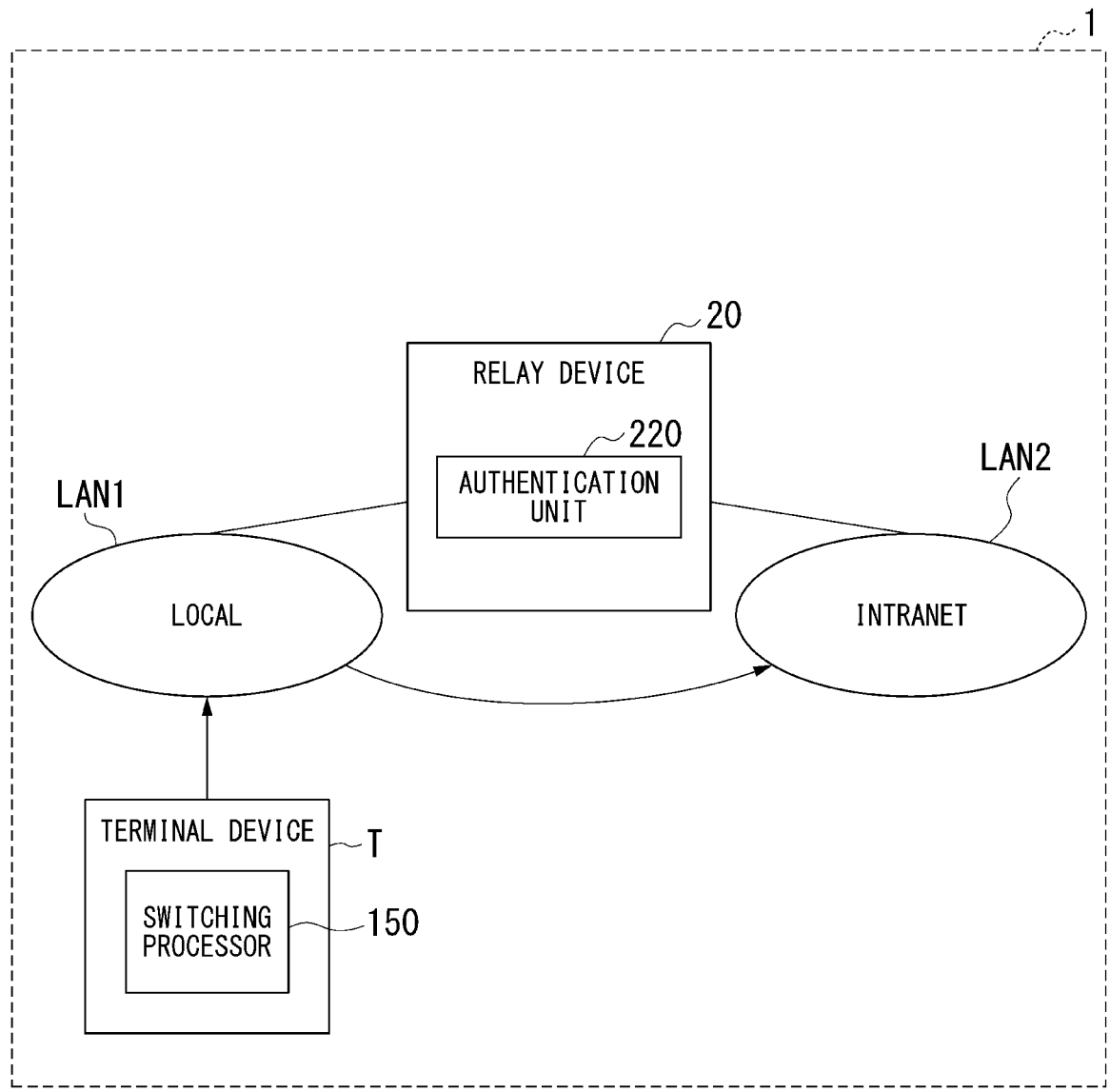
FIG. 8 is an overview diagram illustrating a configuration of a terminal device presentation system according to a first embodiment of the present invention.

FIG. 8 is an overview diagram illustrating a configuration of a terminal device presentation system according to the present embodiment. The terminal device presentation system 1 includes a relay device 20 and a terminal device T. Meanwhile, parts having the same functions as those described in the terminal device presentation system 1Z of the reference example are denoted by the same names and signs and specific description thereof is omitted in the following description.

The relay device 20 includes an authentication unit 220. The terminal device T includes a switching control unit 150. The relay device 20 is connected to a first network LAN1 and a second network LAN2 and communicates with the terminal device T through the first network LAN1 and the second network LAN2.

Meanwhile, an operation through the aforementioned PIN code input screen IM1 is an example of an operation for connecting a company terminal CT or a visitor terminal VT to the relay device 20 through the first network LAN1, and a method for connecting to the first network LAN1 is not limited thereto. For example, a user of the company terminal CT or the visitor terminal VT may manually select connection to the first network LAN1.

Figure 9:
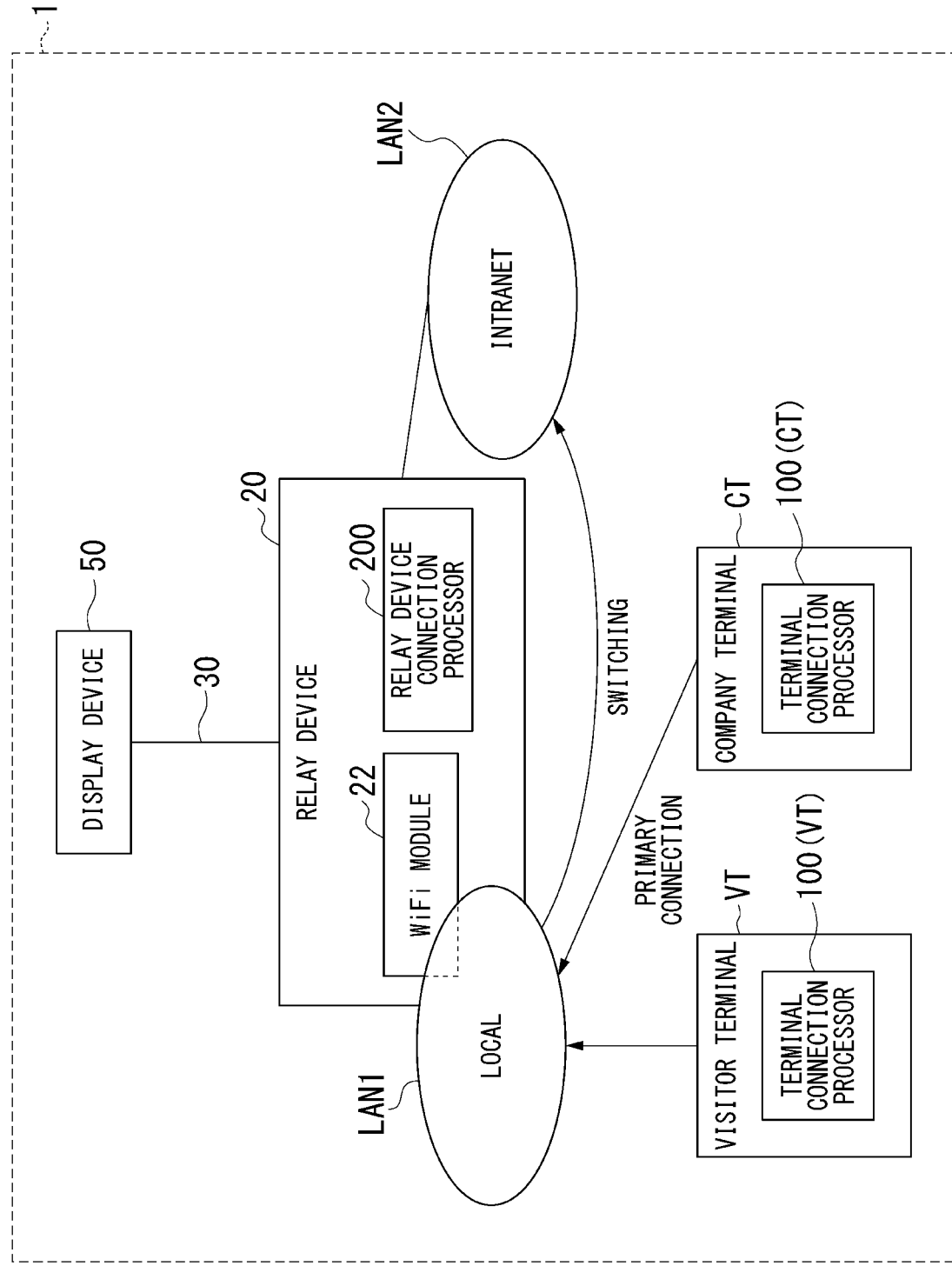
FIG. 9 is an overview diagram illustrating another configuration of the terminal device presentation system according to the first embodiment of the present invention.

FIG. 9 is an overview diagram illustrating another configuration of the terminal device presentation system 1 of the present embodiment. A procedure in which a visitor V uses the terminal device presentation system 1 illustrated in FIG. 9 is the same as the procedure in which a visitor V uses the terminal device presentation system 1Z of the reference example illustrated in FIG. 2, but procedures in which an employee C uses them are different. Accordingly, a procedure and a processing method when an employee C uses the terminal device presentation system 1 will be mainly described below. Meanwhile, the WiFi module 22 illustrated in FIG. 9 is an example of an "access point unit."

An employee C connects the company terminal CT to the first network LAN1 without using the second network LAN2 when starting to use the terminal device presentation system 1 like a visitor V. Hereinafter, there are cases in which a state in which the company terminal CT is connected to the first network LAN1 is referred to as "primary connection." The employee C executes a terminal connection processor 100 through the company terminal CT and opens the PIN code input screen IM1 illustrated in FIG. 3. Meanwhile, the terminal connection processor 100 corresponding to the terminal device presentation system 1 of the present embodiment may display the PIN code input screen IM1 as initial display. The PIN code input screen IM1 is an example of an "input receiving part" and a "transmission part."

The employee C inputs PIN code through the PIN code input screen IM1 of the terminal connection processor 100 using an input device included in the company terminal CT. A relay device connection processor 200 of the terminal device presentation system 1 performs PIN code authentication processing and connects the company terminal CT to the first network LAN1 through connection. An IP address corresponding to the first network LAN1 is allocated to the company terminal CT. The IP address corresponding to the first network LAN1 may be obtained from a dynamic host configuration protocol (DHCP) server in addition to the terminal device presentation system 1 or may be a fixed IP address set by a manager of the company terminal CT. The terminal connection processor 100 operating in the company terminal CT confirms that the company terminal CT has been connected to the first network LAN1 and then transmits a command for searching for a relay device 20 in a user datagram protocol (UDP) broadcast format.

When the relay device 20 receives the command for searching for the relay device which is transmitted by the terminal connection processor 100 of the company terminal CT, the relay device 20 returns a search response including connection information to the company terminal CT in a UDP broadcast format. The search response returned by the relay device 20 may include, for example, an IP address of the relay device 20 when connected through the second network LAN2, information of SSIDs of one or more access points for connecting to the second network LAN2, an IP address of the relay device 20 when connected through the first network LAN1, and the like. For example, an SSID of the connection information returned by the relay device 20 may be manually set by the manager of the terminal device presentation system 1 or set on the basis of history information when connection with a terminal or the like through the second network LAN2 was performed in the past.

The terminal connection processor 100 realized by the company terminal CT performs comparison of a WiFi profile and an SSID registered in the company terminal CT through the connection information included in the search response received from the relay device 20 and determines whether the company terminal CT can be connected to the second network LAN2 by performing authentication of an ID for identifying the employee C and identification information of the terminal device T, or the like. The WiFi profile is network connection setting information retained by the terminal device T. Upon determining that the company terminal CT can be connected to the second network LAN2, the terminal connection processor 100 re-connects the company terminal CT to the second network LAN2. In addition, the terminal connection processor 100 may cause the company terminal CT to display a message representing re-connection to the second network LAN2, or the like upon determining that the company terminal CT can be connected to the second network LAN2. In the following description, there are cases in which connection to the second network LAN2 is referred to as "switching."

Meanwhile, the company terminal CT may have connection information of the second network LAN2 in advance (i.e., the company terminal CT has connected to the second network LAN2 in the past) or may not have the connection information of the second network LAN2 at the time when it is determined that the company terminal CT can be connected to the second network LAN2.

The employee C selects whether to perform switching from the first network LAN1 to the second network LAN2. The terminal connection processor 100 connects to the relay device 20 through the second network LAN2 when the employee C select switching. The terminal connection processor 100 connects to the relay device 20 through the first network LAN1 continuously tor terminal VT when the employee C does not select switching. Further, the terminal connection processor 100 connects to the relay device 20 through the first network LAN1 even when it is not determined that the company terminal CT can be connected to the second network LAN2.

Meanwhile, in the example of FIG. 9, a PIN code input through the PIN code input screen IM1 does not mainly aim at user authentication and may be used as an input key for simplifying connection to the first network LAN1. Simplification of connection may be, for example, unique generation of an SSID from a PIN code by the relay device 20 through a predetermined algorithm to form the first network LAN1. Since the company terminal CT or the visitor terminal VT can uniquely generate an SSID from a PIN code through the same algorithm, it can connect to the first network LAN1 by simply inputting a PIN code through the PIN code input screen IM1 (however, network security settings of the first network LAN1 are additionally required in the company terminal CT or the visitor terminal VT).

Figure 10:
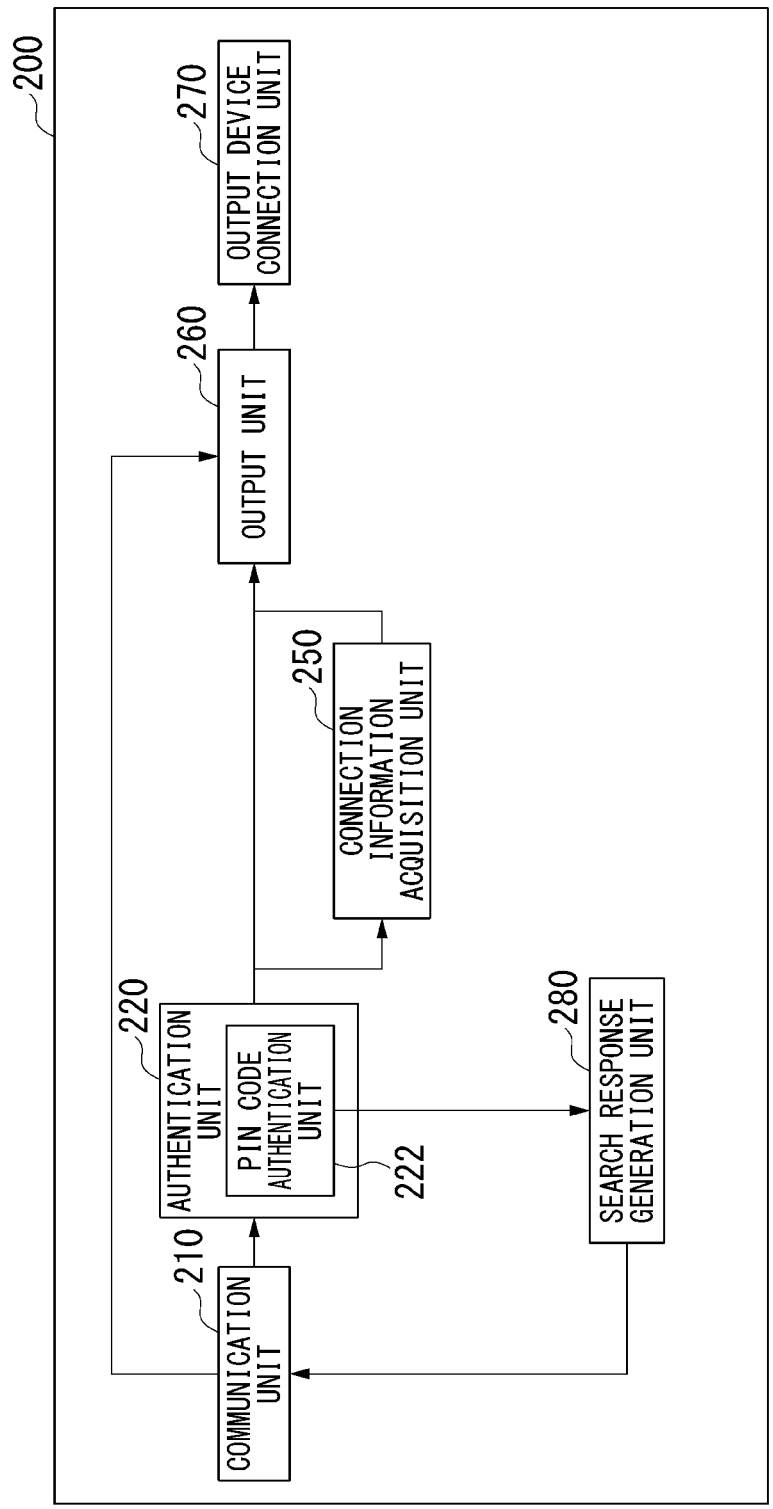
FIG. 10 is a block diagram illustrating a functional configuration of a terminal connection processor of the terminal device presentation system according to the first embodiment of the present invention.

FIG. 10 is a block diagram illustrating a functional configuration of the relay device connection processor 200 of the terminal device presentation system 1 of the present embodiment. The relay device connection processor 200 differs from the relay device connection processor 200Z of the reference example illustrated in FIG. 6 in that the device information acquisition unit 230 and the device information adding unit 240 are deleted and a search response generation unit 280 is added. In addition, a response result transmitted when connection to the terminal connection processor 100 has been established is different from that in the relay device connection processor 200Z of the reference example. Accordingly, processing when connection to the terminal connection processor 100 has been established, which is different from the relay device connection processor 200Z of the reference example, will be described using a case in which connection of the company terminal CT and the relay device 20 is performed.

[When Company Terminal CT Operates PIN Code Input Screen IM1]

The authentication unit 220 receives input information on the basis of an identification result input through the communication unit 210 irrespective of whether a user is an employee C and a visitor V. The PIN code authentication unit 222 identifies a PIN code input to the input receiving part IM1b of the PIN code input screen IM1 and performs PIN code authentication processing.

The communication unit 210 receives a command for searching for the relay device 20, which is transmitted by the terminal connection processor 100 of the company terminal CT, after the company terminal CT connects to the first network LAN1 and outputs the command to the search response generation unit 280. The search response generation unit 280 generates a search response including connection information such as an IP address of the relay device 20 when connected through the second network LAN2, information of service set identifiers (SSIDs) of one or more access points for connecting to the second network LAN2, and an IP address of the relay device 20 when connected through the first network LAN1 and outputs the search response to the communication unit 210. The communication unit 210 returns the search response output from the search response generation unit 280 to the company terminal CT.

Figure 11:
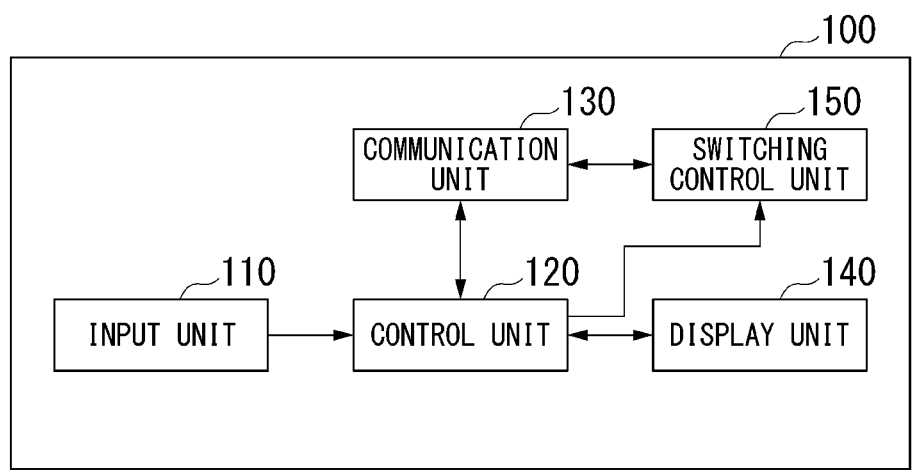
FIG. 11 is an overview diagram illustrating a configuration of a relay device connection processor of the terminal device presentation system according to the first embodiment of the present invention.

FIG. 11 is a block diagram illustrating a functional configuration of the terminal connection processor 100 of the terminal device presentation system 1 of the present embodiment. The terminal connection processor 100 illustrated in FIG. 11 differs from the terminal connection processor 100Z of the reference example illustrated in FIG. 7 in that the former includes a switching control unit 150. Hereinafter, description will be performed focusing on the switching control unit 150.

An input unit 110 receives a PIN code input by an employee C using an input device of the company terminal CT and outputs the PIN code to a control unit 120. The control unit 120 outputs the PIN code output from the input unit 110 to a communication unit 130. The communication unit 130 transmits the PIN code output from the control unit 120 to the relay device connection processor 200. The communication unit 130 receives a response result of the PIN code input from the relay device connection processor 200 and outputs the response result to the control unit 120. The control unit 120 outputs a display command to a display unit 140 in response to the response result of the PIN code input output from the communication unit 130.

The control unit 120 outputs an instruction for searching for the relay device 20 that is a switching target to the switching control unit 150 when the relay device connection processor 200 authenticates the PIN code input by the employee C and connection to the first network LAN1 is established. The switching control unit 150 generates a command for searching for the relay device 20 on the basis of the instruction output from the control unit 120 and outputs the command to the communication unit 130. The communication unit 130 transmits the command for searching for the relay device 20 output from the switching control unit 150 in a broadcasting manner.

The communication unit 130 causes an operating system (OS) of the company terminal CT to execute a web application programming interface (API) of WiFi settings and connects the company terminal CT to the first network LAN1. The web API is a procedure or a rule for accessing some programs through a network. For example, when the OS of the company terminal CT is Windows (registered trademark) series, WlanConnect function is executed.

The communication unit 130 outputs the search response received from the relay device 20 to the switching control unit 150. The switching control unit 150 performs comparison of a WiFi profile and an SSID registered in the company terminal CT through the connection information included in the search response output from the communication unit 130 and determines whether the company terminal CT can connect to the second network LAN2. Here, it is desirable that processing of authenticating an ID for identifying the employee C and identification information of the terminal device T be performed using a dedicated authentication server as a part of processing of determining whether the company terminal CT can connect to the second network LAN2. When it is determined that the company terminal CT can connect to the second network LAN2, the switching control unit 150 outputs a display command to the display unit 140 such that the display unit 140 causes the company terminal CT to display a message for promoting re-connection to the second network LAN2. The display unit 140 outputs the message to a display device of the company terminal CT on the basis of the display command output from the switching control unit 150. Meanwhile, when it is not determined that the company terminal CT can connect to the second network LAN2, switching processing in the corresponding section is unnecessary and thus the switching control unit 150 ends the processing.

When the employee C selects switching and performs input therefor with respect to the message output from the display unit 140, the input unit 110 outputs a switching instruction to the switching control unit 150. The switching control unit 150 disconnects from the first network LAN1 and connects to the second network LAN2 corresponding to the SSID compared with the WiFi profile to be connected with the relay device 20 through the second network LAN2.

Figure 12:
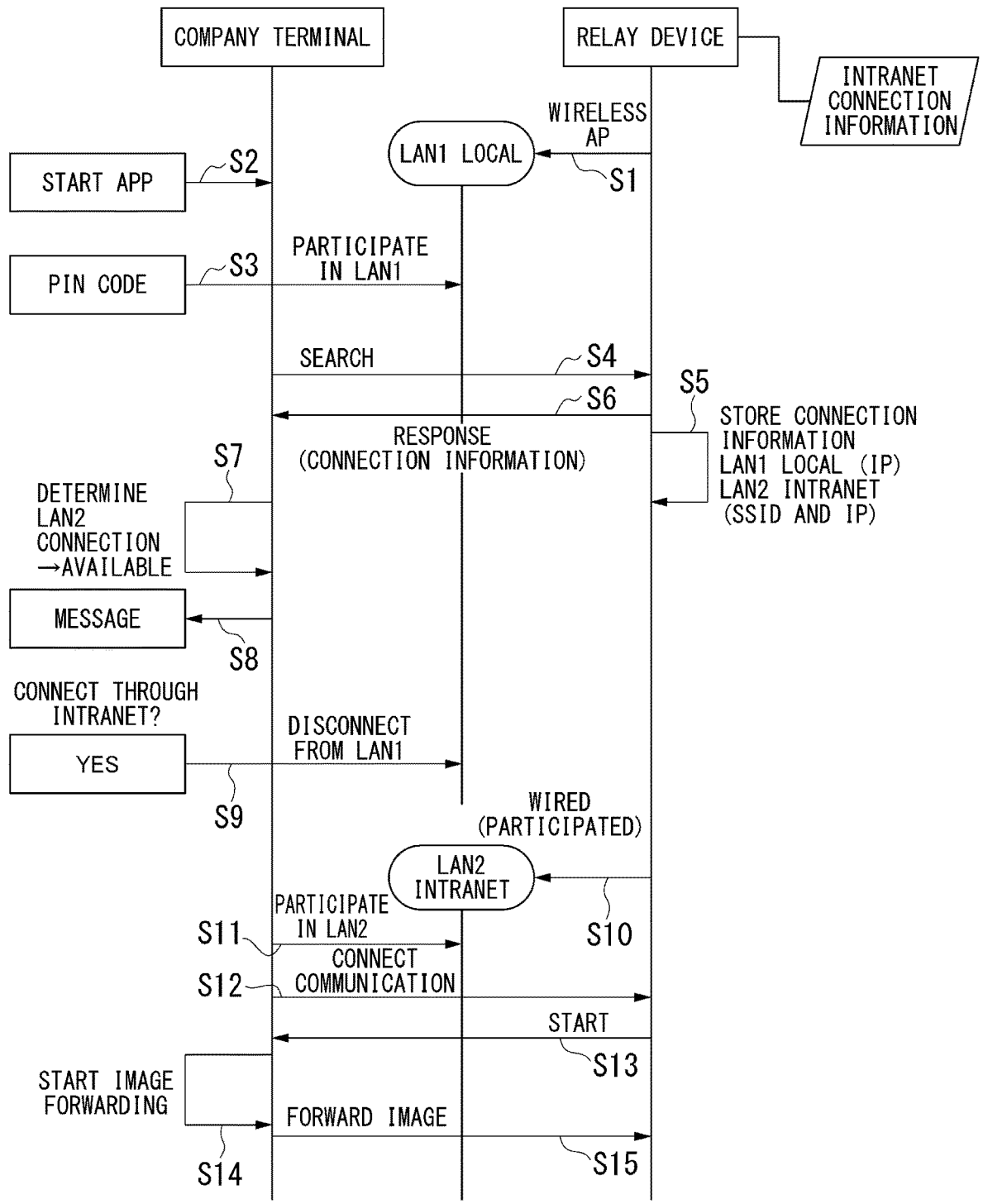
FIG. 12 is a sequence diagram illustrating an example of a connection processing procedure of the terminal device presentation system according to the first embodiment of the present invention.

FIG. 12 is a sequence diagram illustrating a processing flow when the company terminal CT is in a state in which it can communicate with the relay device 20 in the terminal device presentation system 1 according to the first embodiment of the present invention. Meanwhile, processing of step S8 of the sequence diagram illustrated in FIG. 12 may be omitted.

(Step S1) The communication unit 210 of the relay device connection processor 200 establishes connection to the first network LAN1.

(Step S2) The company terminal CT realizes the terminal connection processor 100 (starts the application) and processing proceeds to step S3.

(Step S3) The terminal connection processor 100 receives a PIN code input of an employee C and sequentially connects the company terminal CT to the first network LAN1.

(Step S4) The terminal connection processor 100 transmits a command for searching for the relay device 20 through the first network LAN1 in a broadcasting manner.

(Step S5) The relay device connection processor 200 receives the search command transmitted from the terminal connection processor 100 and generates a search response including connection information.

(Step S6) The relay device connection processor 200 transmits the generated search response to the terminal connection processor 100 of the company terminal CT.

(Step S7) The terminal connection processor 100 determines whether the company terminal CT can connect to the second network LAN2 on the basis of the connection information included in the received search response.

(Step S8) The terminal connection processor 100 displays a message for promoting switching on the company terminal CT when it is determined that the company terminal CT can connect to the second network LAN2.

(Step S9) The terminal connection processor 100 disconnects from the first network LAN1 when the employee C instructs the terminal connection processor 100 to perform switching to the second network LAN2.

(Step S10) The communication unit 210 of the relay device connection processor 200 establishes connection to the second network LAN2 in advance.

(Step S11) The terminal connection processor 100 connects the company terminal CT to the second network LAN2.

(Step S12) The terminal connection processor 100 starts connection of communication between the company terminal CT and the relay device 20 through the second network LAN2.

(Step S13) The relay device connection processor 200 connects connection between the company terminal CT and the relay device 20 through the second network LAN2.

(Step S14) The terminal connection processor 100 starts image forwarding to the relay device 20 through the second network LAN2.

(Step S15) The relay device 20 receives an image forwarded through the second network LAN2 and outputs the image to the display device 50.

Figure 13:
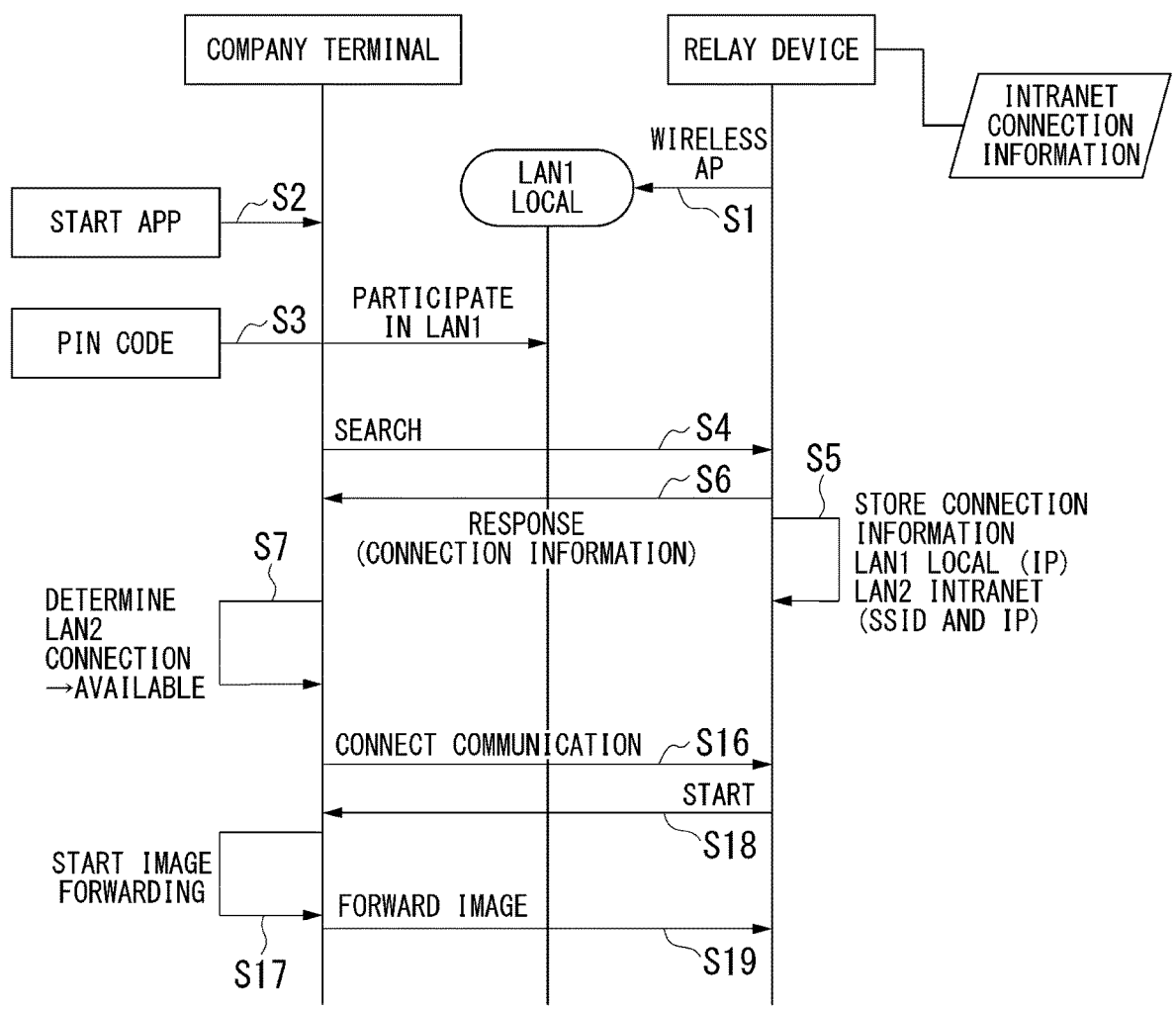
FIG. 13 is a sequence diagram illustrating another example of a connection processing procedure of the terminal device presentation system according to the first embodiment of the present invention.

FIG. 13 is a sequence diagram illustrating a processing flow when the visitor terminal VT is in a state in which it can communicate with the relay device 20 in the terminal device presentation system 1 according to the first embodiment of the present invention. In comparison with the sequence diagram illustrated in FIG. 12, steps S1 to S7 are identical and processing of step S16 and subsequent steps is different. Accordingly, processing of step S16 and subsequent steps will be described hereinafter.

(Step S16) The relay device connection processor 200 connects connection between the company terminal CT and the relay device 20 through the first network LAN1.

(Step S17) The relay device connection processor 200 connects connection between the company terminal CT and the relay device 20 through the first network LAN1.

(Step S18) The terminal connection processor 100 starts image forwarding to the relay device 20 through the first network LAN1.

(Step S19) The relay device 20 receives an image forwarded through the first network LAN1 and outputs the image to the display device 50.

Meanwhile, when the employee C does not select connection to the relay device 20 via the second network LAN2 in step S9 in processing when the company terminal CT is in a state in which it can communicate with the relay device 20 in the terminal device presentation system 1 according to the first embodiment illustrated in FIG. 12, steps S16 to S19 of the sequence diagram illustrated in FIG. 13 are performed instead of steps S9 to S15 illustrated in FIG. 12.

Figure 14:
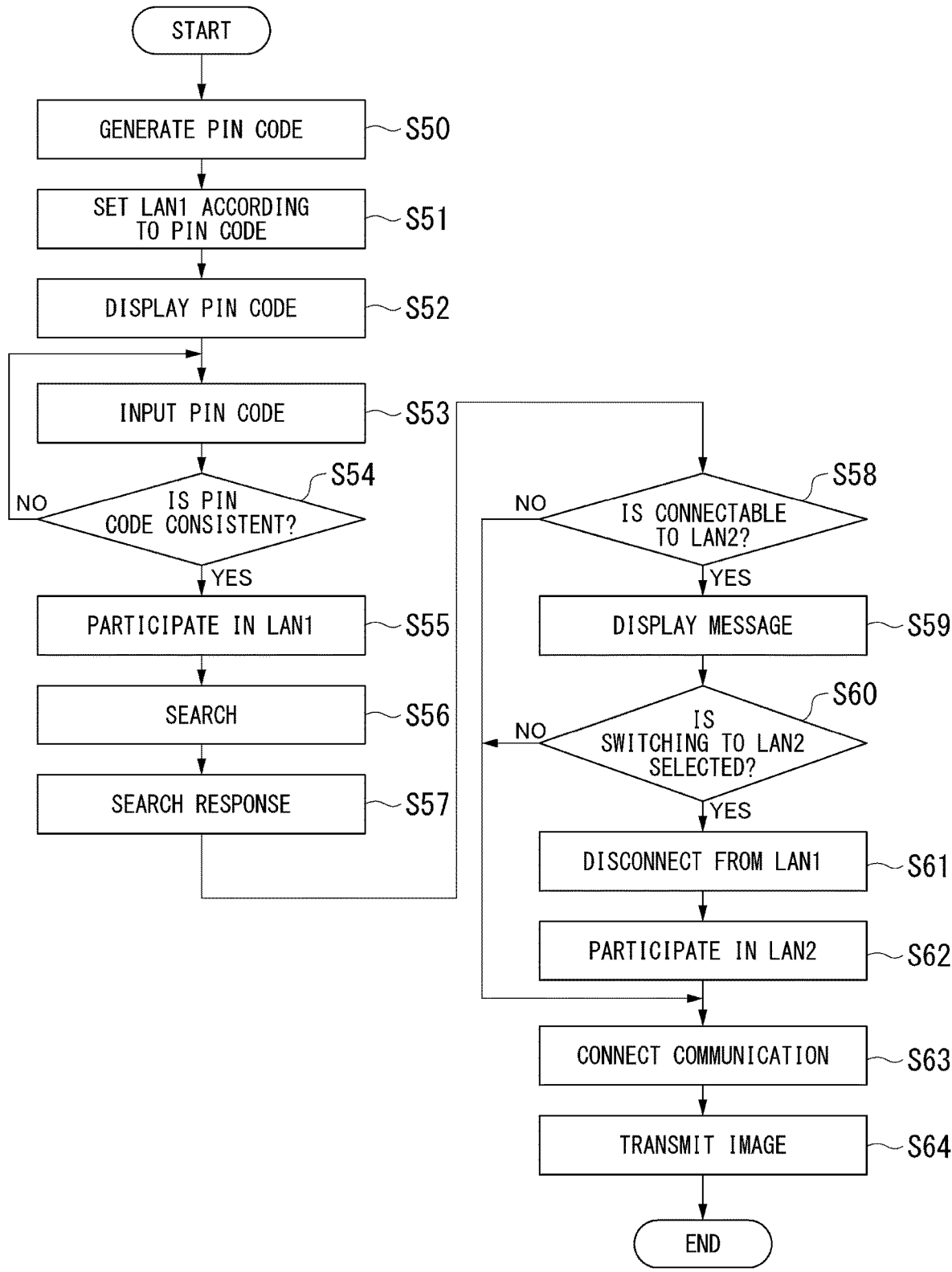
FIG. 14 is a flowchart illustrating an example of a flow of a connection processing procedure of the terminal device presentation system according to another embodiment of the present invention.

FIG. 14 is a flowchart illustrating an example of a flow of connection processing of the terminal device presentation system 1. Meanwhile, processing of steps S50 to S54 of the flowchart illustrated in FIG. 14 is an example of processing for connecting to the first network LAN1 and a user of the company terminal CT may manually connect the company terminal CT to the first network LAN1, for example. In addition, processing of step S59 of the flowchart illustrated in FIG. 14 may be omitted.

(Step S50) A PIN code generated by the manager of the terminal device presentation system 1, or the like is stored in the PIN code authentication unit 222.

(Step S51) The relay device 20 starts provision of a wireless network of the first network for which authentication according to the PIN code has been set.

(Step S52) A user displays the screen IM3 displaying connection information of the terminal device presentation system 1 on the display device 50 or the like and checks a PIN code.

(Step S53) The user inputs the checked PIN code to the terminal connection processor 100.

(Step S54) The terminal connection processor 100 transmits the PIN code input by the user to the relay device connection processor 200 and determines whether the PIN code input to the terminal connection processor 100 is consistent with a character string set in advance by the manager of the terminal device presentation system 1, or the like. When it is determined that the PIN code is consistent with the character string set in advance (Step S54: Yes), processing proceeds to step S55. When it is not determined that the PIN code is consistent with the character string set in advance (step S54: No), processing returns to step S53.

(Step S55) The relay device connection processor 200 causes the terminal device T of the user to participate in the first network LAN1.

(Step S56) The terminal connection processor 100 transmits a command for searching for the relay device 20 through the first network LAN1 in a broadcasting manner.

(Step S57) The relay device 20 returns a search response including connection information to the terminal device T when the command for searching for the relay device 20, transmitted by the terminal connection processor 100, is received.

(Step S58) The terminal connection processor 100 determines whether the terminal device T can connect to the second network LAN2. When it is determined that the terminal device T can connect to the second network LAN2 (Step S58: Yes), processing proceeds to step S59. When it is not determined that the terminal device T can connect to the second network LAN2 (Step S58: No), processing proceeds to step S63.

(Step S59) The terminal connection processor 100 causes the company terminal CT to display a message for promoting re-connection to the second network LAN2 to the user.

(Step S60) The terminal connection processor 100 determines whether the user selects switching to the second network LAN2. When it is determined that switching is selected (Step S60: Yes), processing proceeds to step S61. When it is not determined that switching is selected (Step S60: No), processing proceeds to step S63.

(Step S61) The terminal connection processor 100 disconnects the terminal device T from the first network LAN1.

(Step S62) The terminal connection processor 100 causes the terminal device T to participate in the second network LAN2.

(Step S63) The terminal connection processor 100 transmits an image signal to the relay device 20 through the connected network.

(Step S64) The relay device 20 transmits the received image signal to the display device 50 and causes the display device 50 to project the image. Description of processing of this flowchart ends.

As described above, information (PIN code) used for connection is unified and thus a user can easily understand connection information in the present embodiment. Furthermore, information used by a user for connection is unified in the terminal device presentation system 1 of the present embodiment, and thus it is possible to save the efforts of the user in personally selecting the network LAN1 when connecting to the relay device 20 through communication and additionally understanding a connection method for participating in the network LAN1 and then performing a connection operation, such as saving the efforts of the user in inputting or selecting information about a relay device to be connected or inputting a password for connection, and when the user is an employee C, the function of switching to a more secure network is further provided and thus security settings equivalent to the terminal device presentation system 1Z of the reference example can be realized.

Hereinafter, a terminal device presentation system 1A that is a modified example of the above-described terminal device presentation system 1 of the first embodiment will be described with reference to FIG. 15.

Figure 15:
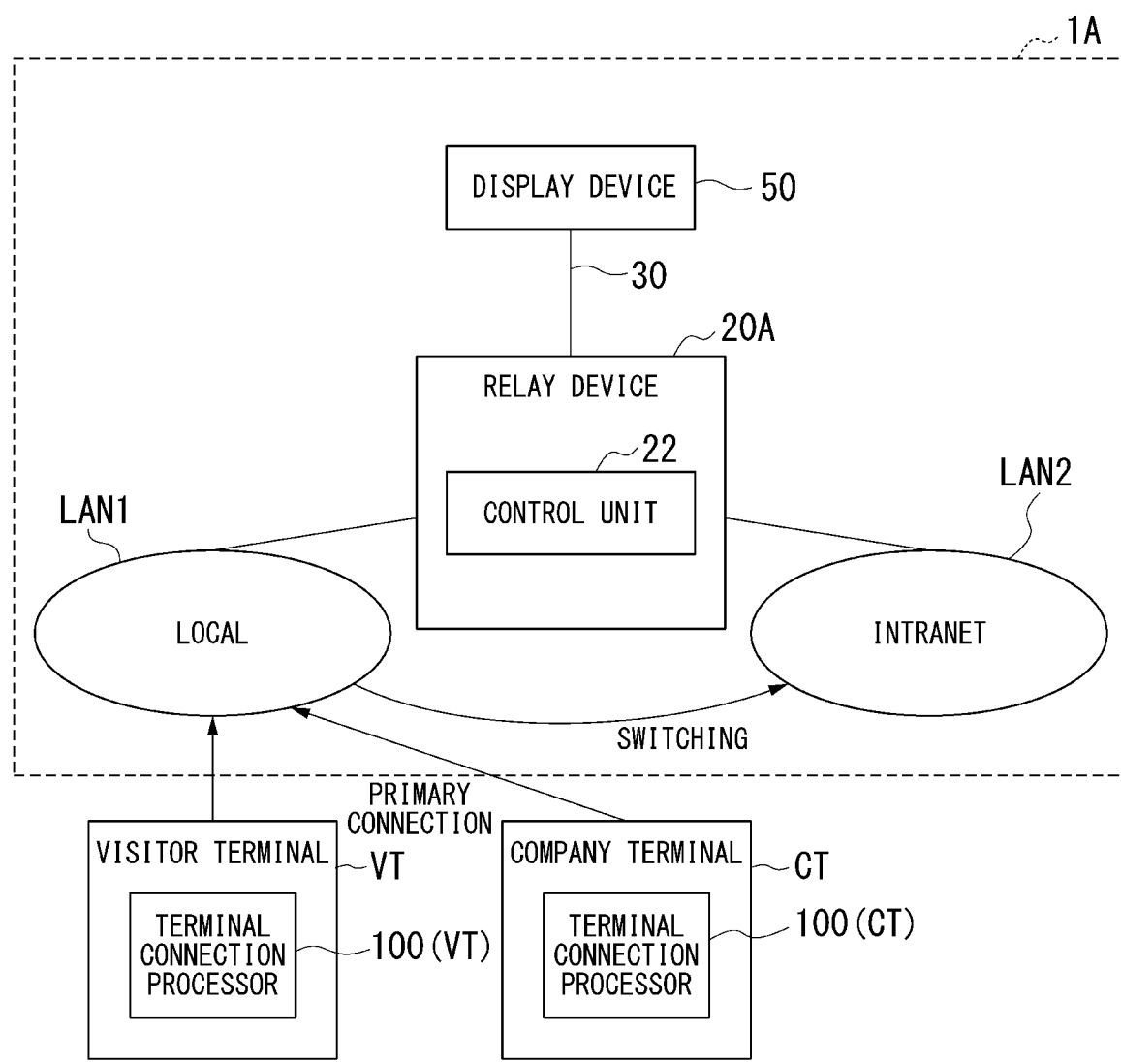
FIG. 15 is an overview diagram illustrating a modified example of a configuration of the terminal device presentation system according to the first embodiment of the present invention.

The terminal device presentation system 1A illustrated in FIG. 15 differs from the terminal device presentation system 1 illustrated in FIG. 9 in that the relay device 20A does not include the WiFi module 22. That is, the relay device 20 of the terminal device presentation system 1 illustrated in FIG. 9 need not consider whether the relay device 20 participates in the second network LAN2 because the relay device 20 also serves as an access point of the second network LAN2. On the other hand, the terminal device presentation system 1A illustrated in FIG. 15 needs to consider whether the relay device 20 participates in the second network LAN2, and when the relay device 20 participates in the second network LAN2, start processing of connecting to the terminal device T.

All or a part of the terminal device presentation system 1 in the above-described embodiment may be realized by a computer. In this case, this may be realized by recording a program for realizing the function on a computer-readable recording medium and causing a computer system to read and execute the program recorded on the recording medium. Meanwhile, it is assumed that the "computer system" mentioned here includes an OS and hardware such as peripheral devices. In addition, the "computer-readable recording medium" refers to portable media such as a flexible disc, a magneto-optical disk, a ROM and a CD-ROM, and a storage device such as a hard disk embedded in a computer system. Further, the "computer-readable recording medium" may include a recording medium dynamically storing a program for a short time, such as a communication line when the program is transmitted through a network such as the Internet or a communication circuit such as a telephone circuit, and a recording medium storing a program for a specific time, such as a volatile memory in a computer system serving as a server or a client in such a case. In addition, the aforementioned program may be a program for realizing some of the above-described functions, may be a program that can realize the above-described functions by being combined with a program that has already been recorded on a computer system, or may be a program realized using a programmable logic device such as an FPGA.

While embodiments of the present invention have been described with reference to the drawings, specific configurations are not limited to the embodiments and also include a design and the like without departing from the gist of the present invention.

REFERENCE SIGNS LIST

1 Terminal device presentation system
20 Relay device
22 WiFi module
50 Display device
100 Terminal connection processor
150 Switching control unit
220 Authentication unit

What is claimed is:

1. A terminal device presentation system comprising:
a relay device which relays communication between a display device and a terminal device, transmits an image signal from the terminal device to the display device and causes the display device to display the image signal; and
a terminal connection processor which performs processing of connection to the relay device in the terminal device,
wherein the relay device includes a connection processor which transmits connection information of an accessible network to the terminal device, and
wherein the terminal device includes a switching control unit which connects the terminal device to a second network that is accessible for at least the relay device and different from a first network and is set in the terminal device such that a user of the terminal device uses the second network in preference to the first network when the terminal device is connectable to the second network,
wherein the relay device further includes a search response generation unit which generates a search response including connection information at the time of connecting to the relay device through the second network and transmits the search response to the terminal device connected to the first network through the first network,
the terminal connection processor determines whether the second network is set such that the terminal device preferentially uses the second network in response to the search response and switches connection to the second network when the second network is set such that the terminal device preferentially uses the second network, and wherein the switching control unit performs, based on the connection information included in the search response, a comparison between a network connection setting information retained by the terminal device and an identification information registered in the terminal device, and the switching control unit determines based on a result of the comparison, whether the terminal device can be connected to the second network.

2. The terminal device presentation system according to claim 1, wherein the second network is provided as a wireless communication system, and the terminal device presentation system further comprises an access point unit which realizes an access point of the second network.

3. A terminal device connected to the terminal device presentation system according to claim 1, comprising:
   an input receiving unit which receives input of source information generating connection information of the second network; and
   a transmission unit which transmits the input information received by the input receiving unit to a relay device.

4. The terminal device presentation system according to claim 1, further comprising:
   an authentication unit configured to identify whether a user is an employee or a visitor and to perform authentication processing for determining whether to receive an input information.

5. The terminal device presentation system according to claim 4,
   wherein the authentication unit is configured to acquire identification information of the terminal, inquire of an authentication server about the acquired identification information, and when the identification information on a company terminal has been registered, authenticate that the user is an employee.

6. The terminal device presentation system according to claim 4, wherein the authentication unit is configured not to receive input information through operation of a PIN code input screen when the user is the employee and the authentication unit is configured to receive input information through operation of the PIN code input screen when the user is the visitor.

* * * * *